D. T. BACHAND.
MEASURING DEVICE.
APPLICATION FILED SEPT. 14, 1915.

1,273,720.

Patented July 23, 1918.
2 SHEETS—SHEET 1.

Witnesses:

Inventor,
D. T. Bachand.

By Victor J. Evans,
Attorney.

D. T. BACHAND.
MEASURING DEVICE.
APPLICATION FILED SEPT. 14, 1915.

1,273,720.

Patented July 23, 1918.
2 SHEETS—SHEET 2.

Witnesses;
C. Peinle Jr.
Edw[...]

Inventor,
D. T. Bachand.

By Victor J. Evans,
Attorney.

UNITED STATES PATENT OFFICE.

DELMERY T. BACHAND, OF SPRINGFIELD, MASSACHUSETTS, ASSIGNOR OF ONE-HALF TO JOSEPH CHEVALIER, JR., OF CHICOPEE, MASSACHUSETTS.

MEASURING DEVICE.

1,273,720.　　　Specification of Letters Patent.　　Patented July 23, 1918.

Application filed September 14, 1915. Serial No. 50,699.

*To all whom it may concern:*

Be it known that I, DELMERY T. BACHAND, a subject of the King of Great Britain, residing at Springfield, in the county of Hampden and State of Massachusetts, have invented new and useful Improvements in Measuring Devices, of which the following is a specification.

The present invention contemplates the provision of a device for measuring rice, beans, peas and like substances, and is especially designed for use in connection with bins which contain the same.

The primary object of this invention resides in the provision of a device of this character capable of adjustment for the purpose of measuring different predetermined quantities as the occasion may require, the device being simple in construction and easily manipulated for the purpose intended.

Other objects and advantages will appear as the nature of the invention is better understood from the following description wherein the combination, construction and arrangement of parts are fully set forth in detail and claimed.

In the drawings forming part of this application like numerals of reference indicate similar parts in the several views and wherein:—

Figure 1:
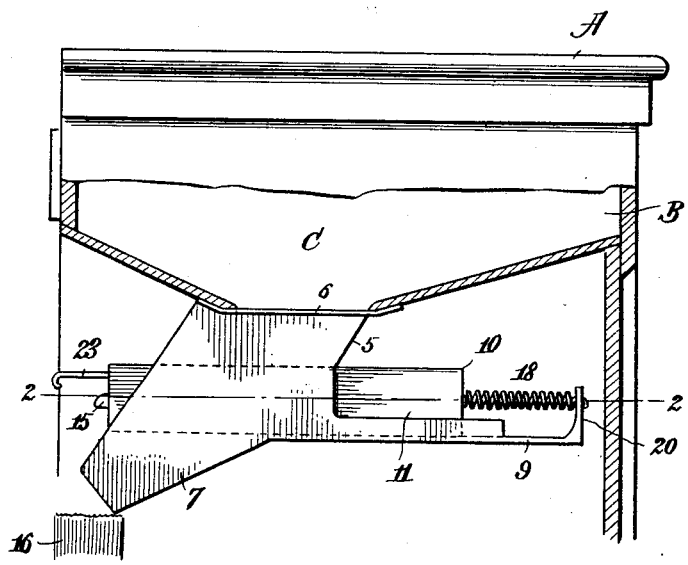
Figure 1 is an end elevation of a counter partly broken away showing the device forming the subject matter of my invention associated therewith.
Figure 2:
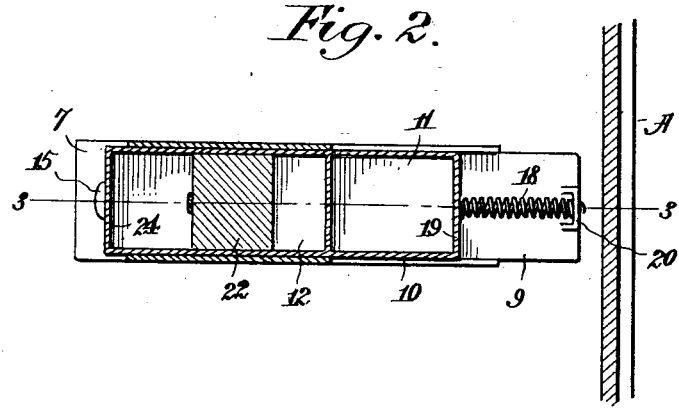
Fig. 2 is a horizontal sectional view on line 2—2 of Fig. 1.
Figure 3:
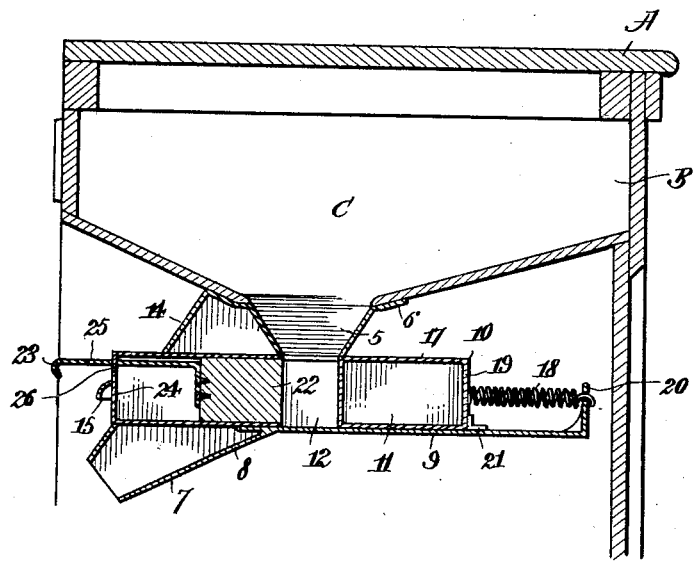
Fig. 3 is a vertical sectional view on line 3—3 of Fig. 2.
Figure 4:
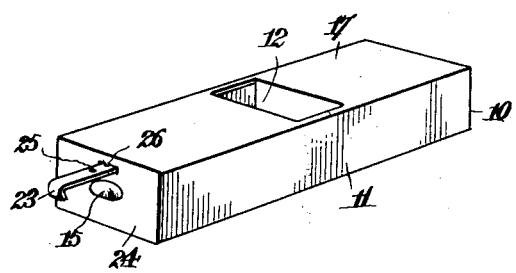
Fig. 4 is a perspective view of the casing.
Figure 5:
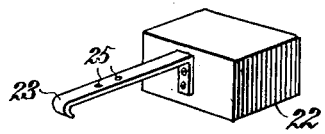
Fig. 5 is a perspective view of the adjustable block.

Referring more particularly to the drawings A indicates a cabinet divided by means of the partitions B into a plurality of separate compartments or bins C for containing rice, beans, peas or like substances, the bottom of each bin being inclined as shown and provided with an enlarged discharge opening. While I have shown the device forming the subject matter of my invention used in connection with a cabinet of this character, it is to be understood that the same is susceptible for use with any bin of usual construction providing the same has a discharge opening in the bottom thereof.

The device essentially consists of a hopper 5 arranged beneath and in alinement with the opening in the bottom of the bin, and provided with a marginal flange 6 adapted to be secured to the bottom in any suitable manner. Projecting forwardly from one side of the hopper is a discharge chute 7 which may form an integral part of the hopper or be removably secured thereto in any suitable manner. The bottom wall 8 of the chute is extended rearwardly an appreciable distance beyond the hopper in spaced relation thereto and forms a support 9 for the measuring device 10, and upon which support the measuring device is mounted for sliding movement for the purpose to be presently described.

The measuring device comprises an elongated casing 11 having a vertical opening 12 at a point approximately central thereof, and which opening is normally disposed beneath the lower end of the hopper 5 and closed at its lower end by means of the support 9, whereby said opening defines a pocket for the reception of a predetermined quantity of the material contained in the bin. That portion of the casing in advance of the opening 12 extends through the discharge chute and projects a slight distance in advance of the front wall 14 thereof, and provided with a handle 15 of any suitable construction for the purpose of moving the casing forwardly to a discharge position. It will be manifest that when the casing is drawn forwardly as above stated, the required distance to bring the opening 12 within the chute 7, and away from the support 9, the material contained within the pocket defined by the opening 12 is discharged therefrom into the chute 7, which latter guides the material into a bag or other suitable receptacle 16 supported beneath the open end of the chute. During this operation the top wall 17 of the casing is moved across the open end of the hopper 5 serving in the capacity of a cut-off for the latter. Subsequent to the discharge of the material, the casing 11 is automatically returned to normal position under the influence of the spring 18 terminally secured at one end to the rear wall 19 of the casing, and having its opposite end secured to an upright 20 rising from the support 9. Rising from the support 9 at a suitable point in advance of the upright 20, is a stop 21 to limit the return movement of the casing so as to bring the pocket 12 directly beneath the lower end of the hopper 5 to be again refilled by the material from the bin C.

With a view of varying the capacity of the pocket 12, for the purpose of measuring a pint, quart or the like as desired, I employ an adjustable member 22 which as shown in this particular instance is in the nature of a block arranged in that portion of the casing 11 in advance of the opening 12, and adapted to be moved within and without the pocket to vary the capacity thereof. The block is adjusted by means of a resilient strip of material 23 constituting a handle projecting through an elongated slot in the front wall 24, of the casing, which handle is provided with a suitable opening 25 for the reception of a pin or stud 26 depending from the upper edge of the slot to hold the block in one of its adjusted positions. If desired any number of openings in the handle may be provided, and properly spaced to hold the block in a number of adjusted positions to vary the capacity of the pocket for predetermined quantities of material. The device is especially advantageous for retail grocers, as it saves considerable time in the dispensing of material such as rice, peas or the like, measuring accurately the desired quantity without resorting to the use of a scale or other measuring device.

It is believed that from the foregoing description the nature and advantages of the invention will be thoroughly understood without requiring a more extended explanation and therefore the same has been omitted. However I desire to have it understood that I do not limit myself to the precise construction and arrangement of parts herein illustrated and described, as changes in this respect may be resorted to when desired as fall within the scope of the appended claim.

What is claimed is:—

The combination with a bin having a discharge opening in the bottom thereof, of a hopper arranged beneath said opening, a discharge chute projecting forwardly at an angle from said hopper, and formed integrally therewith, one wall of said chute being extended rearwardly and forming a support, a casing slidably mounted upon said support and movable through said chute, said casing having a pocket communicating with the hopper in normal position to receive a predetermined quantity of material from said bin, a block mounted in said casing and provided with an operative handle the latter having an opening therein, said casing having at one end thereof an elongated slot, and a projecting stud in said slot to register with the opening in the handle, which latter moves the block to adjusted and discharged positions, and means for automatically returning the device to normal position subsequent to the discharge thereof.

In testimony whereof I affix my signature in presence of two witnesses.

DEL T. BACHAND.

Witnesses:
ALONZO T. HUSSEY,
JOSEPH J. CHEVALIER.

Copies of this patent may be obtained for five cents each, by addressing the "Commissioner of Patents, Washington, D. C."